United States Patent [19]
Chou

[11] Patent Number: 4,964,432
[45] Date of Patent: Oct. 23, 1990

[54] METHOD AND MEANS FOR MOUNTING VALVE MEMBER ON VALVE STEM

[75] Inventor: Alan F. Chou, Sugar Land, Tex.
[73] Assignee: Keystone International, Inc., Houston, Tex.
[21] Appl. No.: 495,162
[22] Filed: Mar. 19, 1990
[51] Int. Cl.$^5$ .................. F16K 43/00; F16K 1/02; F16K 31/50
[52] U.S. Cl. .................... 137/15; 137/315; 251/214; 251/223; 251/225; 251/327; 251/357; 403/326
[58] Field of Search .............. 137/15, 315; 251/88, 251/214, 222, 223, 225, 327, 357; 403/326

[56] References Cited

U.S. PATENT DOCUMENTS

| | | | |
|---|---|---|---|
| 15,030 | 6/1956 | Worthington | 251/223 |
| 3,040,400 | 6/1962 | Coady | 251/319 |
| 3,262,673 | 7/1966 | Seeley | 251/357 |
| 3,512,753 | 5/1970 | Weise | 251/327 |
| 3,529,805 | 9/1970 | Callahan, Jr. et al. | 251/214 |
| 4,281,678 | 8/1981 | Claycomb | 137/315 |
| 4,426,093 | 1/1984 | Roush | 251/214 |
| 4,431,021 | 2/1984 | Scaramucci | 251/223 |
| 4,597,581 | 7/1986 | Nimberger | 251/214 |
| 4,630,629 | 12/1986 | Nimberger | 251/223 |
| 4,822,228 | 4/1989 | Senft et al. | 403/326 |

OTHER PUBLICATIONS

Anderson Greenwood Bulletin 1-220-M5AK, Feb., 1988.
Precision General Incorporated Catalog V987, Sep., 1987.
Anderson Greenwood Bulletin 1-130-H7, Oct., 1989.
Anderson Greenwood (AGCO) Catalog 1520-H1 Hand Valve, Revised Oct., 1980, (p. 2).
Anderson Greenwood Bulletin, 1-250-H1, Jul., 1989.
Anderson Greenwood Bulletin 1-120-H1, Aug., 1988.

*Primary Examiner*—George L. Walton
*Attorney, Agent, or Firm*—Dodge, Bush & Moseley

[57] ABSTRACT

A method and means for removably connecting a valve member (62, 62A) on a valve stem (46, 46A) for movement between open and closed position relative to a valve seat (24, 24A). The removable connection includes a split frustoconical connector (76, 76A) forming two halves (78, 78A) which fit about a frustoconical section (56, 56A) of the valve stem (46, 46A). A retainer sleeve (84, 84A) holds the split connector (76, 76A) about the frustoconical section (56, 56A) of the stem (46, 46A).

16 Claims, 3 Drawing Sheets

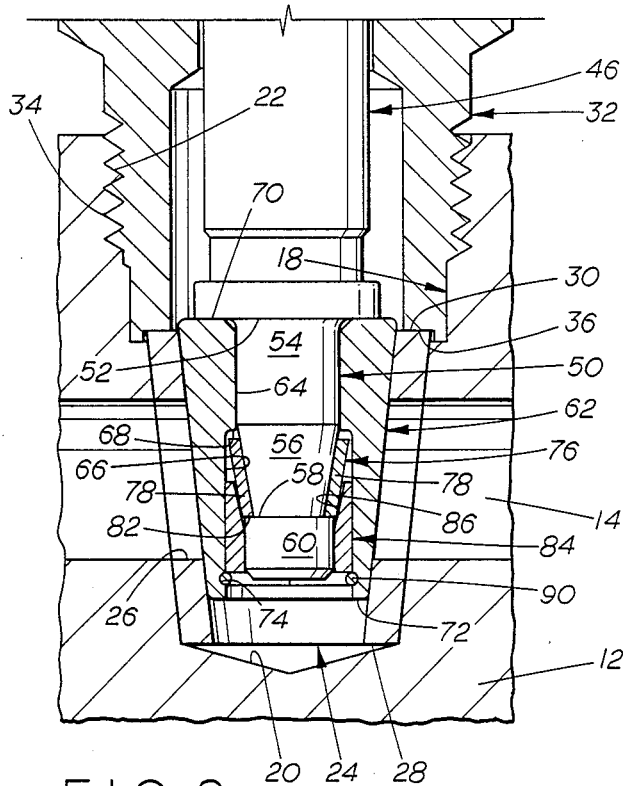
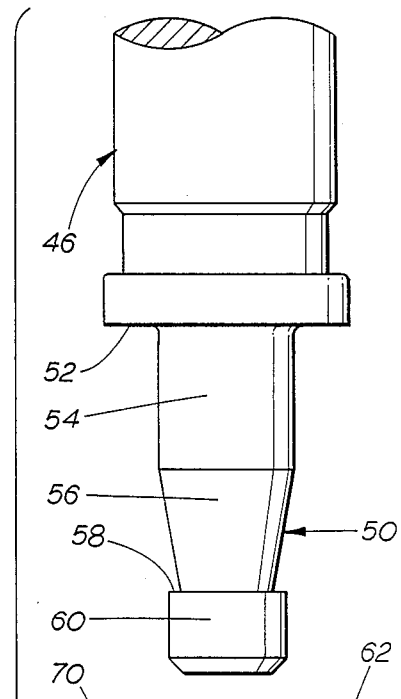
FIG.2    FIG.4
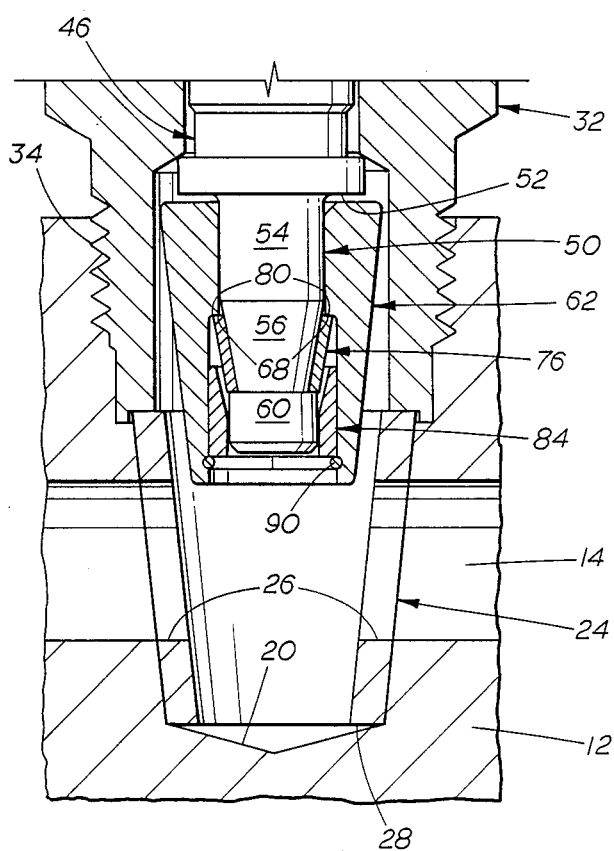
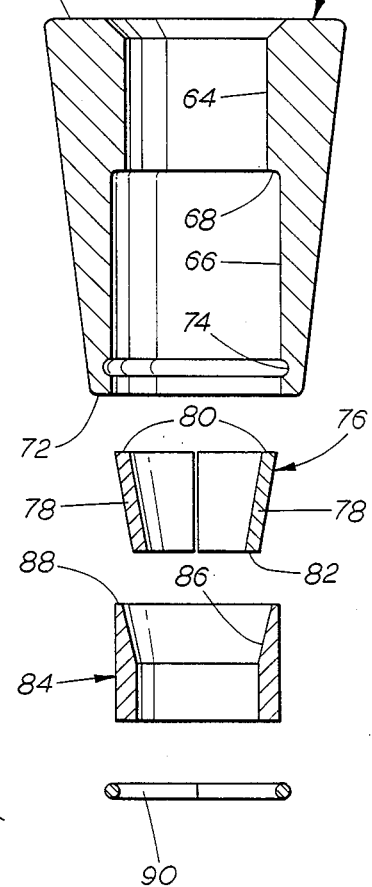
FIG.3

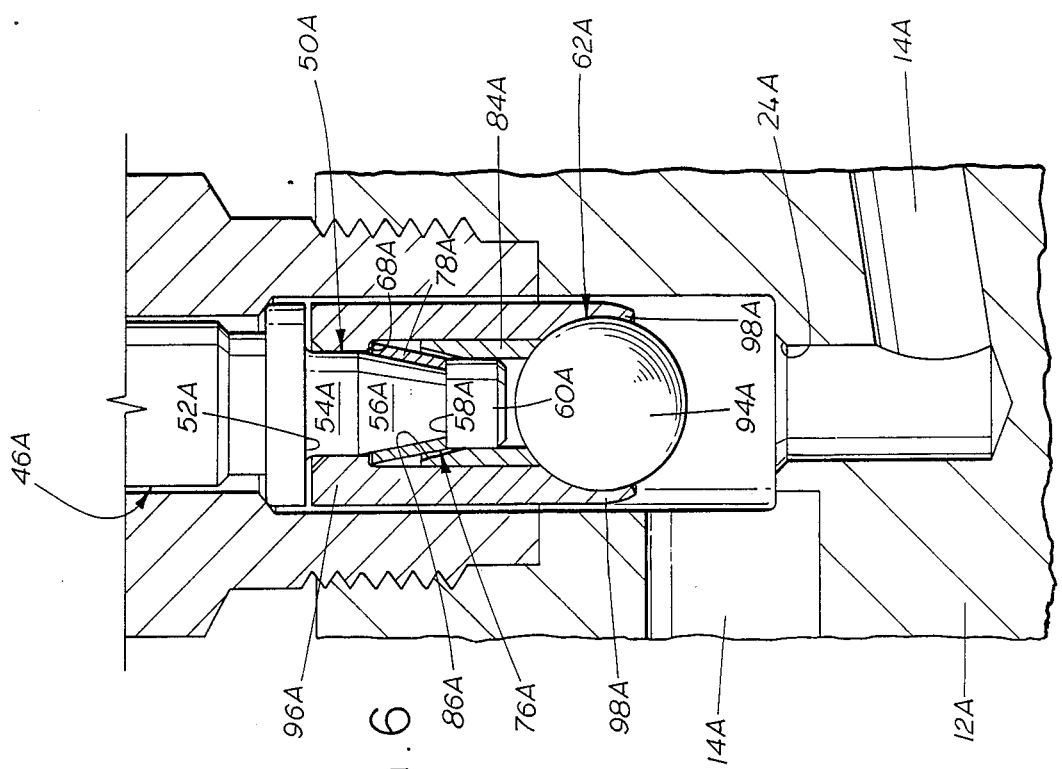
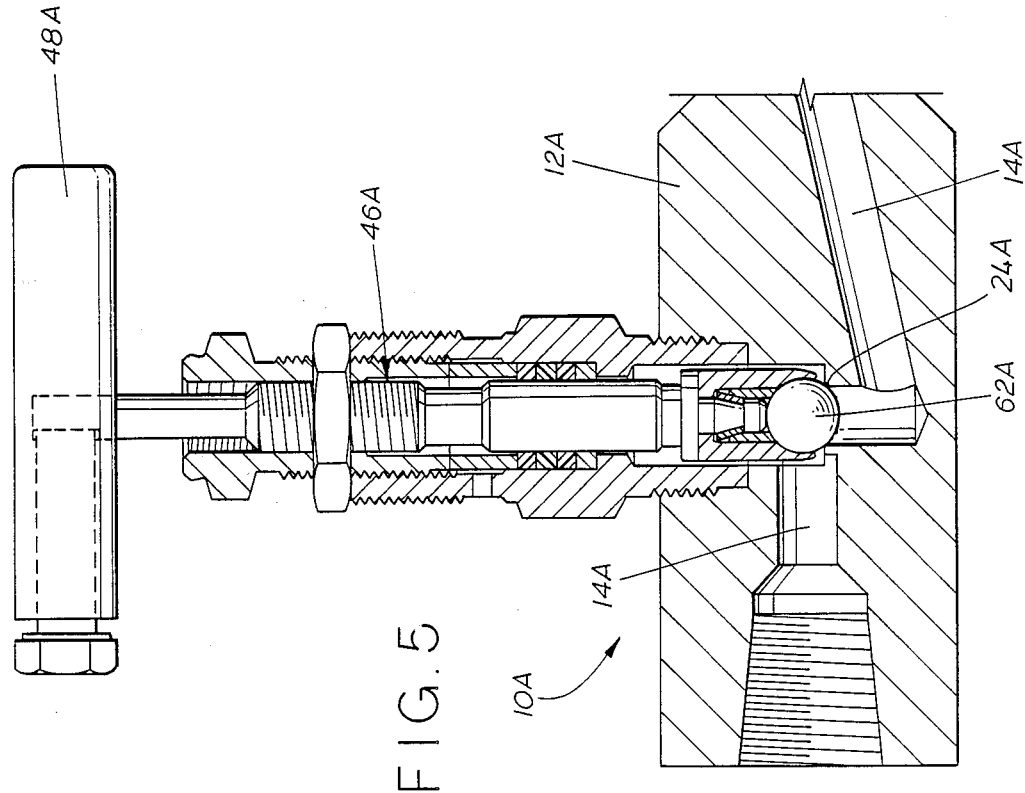

METHOD AND MEANS FOR MOUNTING VALVE MEMBER ON VALVE STEM

BACKGROUND OF THE INVENTION

This invention relates to valves having a reciprocable valve member connected to a stem for movement between open and closed positions, and more particularly to means for removably mounting the valve member on the end of the valve stem.

Heretofore, valves such as plug valves have included a reciprocable valve member mounted on the lower end of a valve stem and movable between open and closed positions relative to a fixed seat in the valve body. A valve member such as a tapered plug valve member has been attached to or mounted on the lower end of the stem by various means heretofore. Particularly for relatively large plug valves having flow passages over $\frac{3}{8}$ inch in diameter, for example, the plug member has been attached to the stem for relative rotation with some amount of longitudinal movement between the stem and the plug member for achieving proper seating within the tapered valve seat. Some plug members, for example, have been attached to the stem heretofore with a snap ring and some have been secured by a threaded nut on the inner end of the stem.

The attachment for the plug valve member must be adequate to withstand the upward pulling force exerted by the stem in pulling the valve member to open position. Also, the tapered plug member should be mounted so that a simple and fast replacement may be provided such as may be necessary in the event of excessive wear or damage, and particularly without the use of any special replacement tools.

SUMMARY OF THE INVENTION

The present invention is directed to a removable attachment for mounting a reciprocable valve member on the end of a stem for assembly and disassembly in a minimum of time. The valve member is connected to a frustoconical section of the stem by a split frustoconical connector fitting about the frustoconical section. The connector halves are easily fitted about the frustoconical section by dropping or fitting the halves within an open end of the valve member for engagement with a shoulder on the valve member adjacent the frustoconical stem section and subsequent fitting about the frustoconical section. Then, the connector halves are retained about the stem section by a retainer sleeve also dropped within the open end of the valve member about the stem for fitting about the connector halves. Such a connection between the stem and valve member can be easily assembled and disassembled manually without the use of any special replacement tools.

The frustoconical connector halves fit between opposed shoulders on the valve member and the stem, and upon movement to open position the shoulders abut opposite ends of the connector halves for transmitting the opening force exerted by the rising stem to the valve member to pull the valve member to an open position relative to the seat and associated flow passage.

It is an object of this invention to provide an improved method and means for removably connecting a reciprocable valve member to a valve stem for movement of the valve member between open and closed positions relative to a fixed seat about a flow passage in a valve body.

It is a further object of this invention to provide such a method and means in which the valve member is connected to a frustoconical section of the valve stem by utilizing a split connector fitting around the frustoconical section of the valve stem so that the valve member may be assembled and disassembled from the valve stem in a minimum amount of time.

Other objects, features, and advantages of this invention will become more apparent after referring to the following specifications and drawings.

DESCRIPTION OF THE DRAWINGS

FIG. 2 is an enlarged fragment of FIG. 1 showing the tapered plug valve member connected to the inner end of the stem by the mounting means of the present invention and in a seated closed position within the tapered seat;

FIG. 3 is a view similar to FIG. 2 but showing the stem and plug valve member in the open position of the plug valve member removed from the tapered seat;

FIG. 4 is an exploded view of FIG. 3 showing particularly the removable mounting means for connecting the tapered plug valve member to the stem;

FIG. 5 is a sectional view of another embodiment of the present invention including a valve member having a ball seat mounted on the end of a stem for movement between open and closed positions and showing the valve member in closed position; and FIG. 6 is an enlarged fragment of FIG. 5 but showing the valve member and stem in an open position thereof to permit fluid flow through the flow passage.

DESCRIPTION OF THE INVENTION

Figure 1:
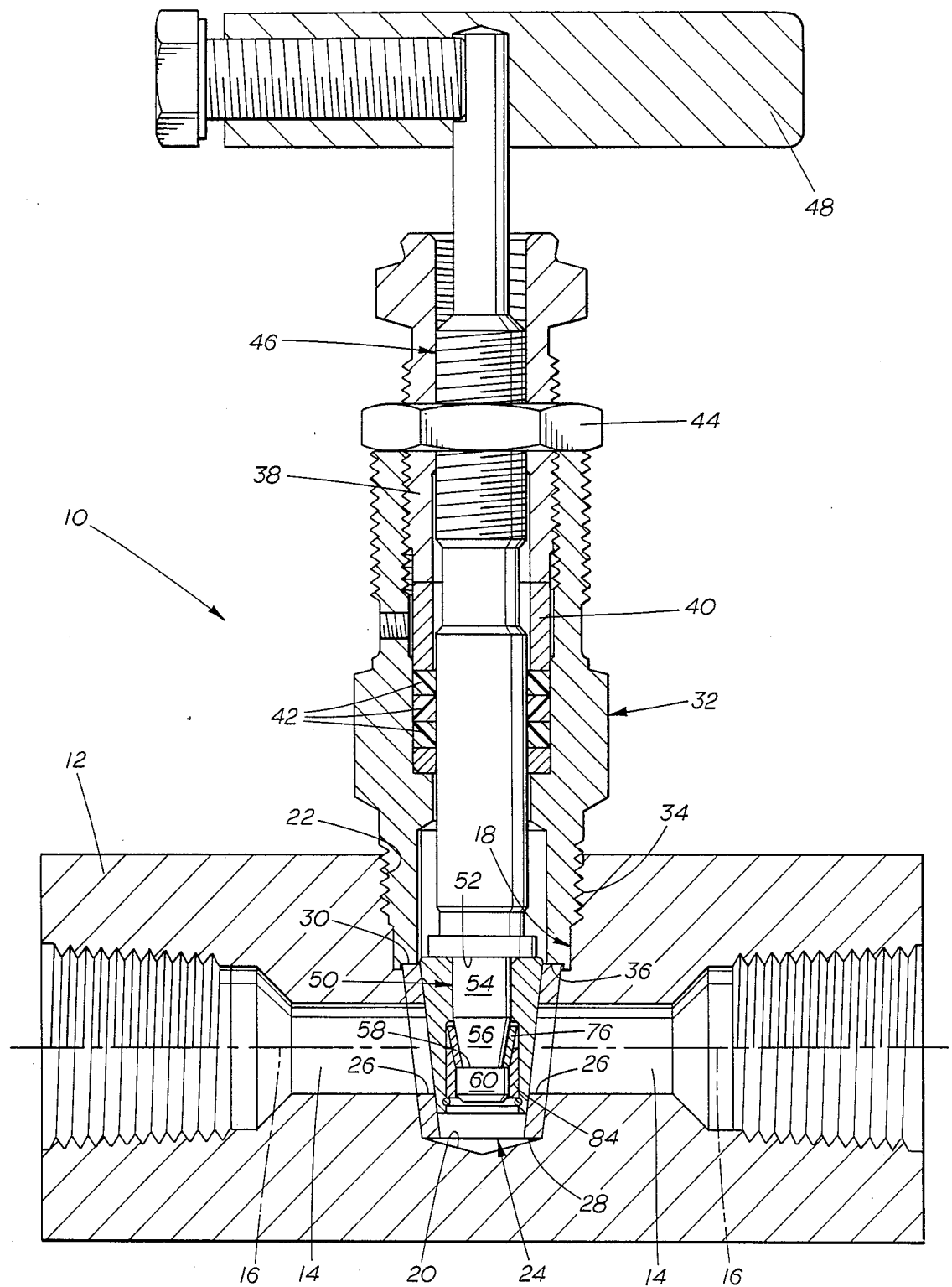
FIG. 1 is a sectional view of one embodiment of the invention illustrating a hand operated plug valve including a tapered plug valve member on the end of a reciprocable valve stem and mounted for movement between open and closed positions on a tapered valve seat.

Referring to the embodiment of the invention shown in FIGS. 1-4, a plug valve is generally indicated at 10 and includes a valve body 12 having a longitudinally extending flow passage 14 therethrough adapted for fluid flow in either direction along a longitudinal axis indicated at 16.

A bore indicated generally at 18 in valve body 10 extends in a perpendicular direction to longitudinal axis 16 of flow passage 14 and has a closed end forming a bottom at 20. Bore 18 has internal screw threads at 22. A tapered valve seat is shown generally at 24 fixed within body 12 across flow passage 14 and having opposed openings 26 therein in axial alignment with flow passage 14. Seat 24 has a lower end 28 abutting bottom 20 and an opposed upper large diameter end 30.

A housing or bonnet generally indicated at 32 has external screw threads at 34 threaded within bore 18 in engagement with internal screw threads 22. The inner end 36 of housing 32 is in abutting contact with upper end 30 of valve seat 24 for holding valve seat 24 in position. An externally threaded bushing 38 is threaded within housing 32 and is in abutting contact with a follower 40 for compressing packing rings 42. A lock nut 44 secures bushing 38 within housing 32.

A stem generally indicated at 46 is threaded within bushing 38. An outer end portion has a handle 48 for rotation of stem 46 relative to bushing 38 and housing 32 to provide a so-called rising stem. Stem 46 has an inner end portion generally designated at 50 extending inwardly from a flange which forms an annular shoulder 52. Inner end portion 50 defines a large diameter cylindrical section 54, a frustoconical intermediate section 56 which defines an annular shoulder 58, and a small diameter cylindrical end section 60.

A tapered or frustoconical plug valve member generally designated 62 has a central bore therethrough defining a small diameter bore portion 64 and a large diameter bore portion 66 with an annular shoulder 68 defined at the juncture of bore portions 64 and 66. Plug valve member 62 also defines a large diameter upper annular end 70 in abutting contact with shoulder 52 on stem 46 and an opposite lower annular end 72. An inner annular groove 74 is provided adjacent lower end 72 of tapered valve member 62.

For removably attaching or mounting tapered plug valve member 62 onto stem 46, a split connector indicated at 76 is formed of two halves 78 of a frustoconical shape for fitting about frustoconical section 56. A large diameter end surface 80 on connector 76 is mounted adjacent annular shoulder 68 of plug valve member 62 and a small diameter inner end surface 82 on connector 76 is positioned adjacent annular shoulder 58 of frustoconical section 56 of stem 46. To hold the two halves 78 together about frustoconical stem section 56, a retainer sleeve shown at 84 fits about small diameter end section 60 of stem 46 and has a tapered surface 86 about its inner periphery adjacent outer end 88. Tapered surface 86 flares outwardly at an angle around two degrees greater than the adjacent tapered outer surface of connector halves 78 so that inner end 82 of connector 76 contacts tapered surface 86 generally along a line contact area. To hold retainer sleeve 84 in position, a split retainer ring 90 is mounted within groove 74 on tapered plug member 62.

To assemble tapered plug valve member 62 onto stem 46, plug valve member 62 is first fitted on end portion 50 with end surface 70 in abutting contact with annular shoulder 52 on stem 46. Then, connector halves 78 are inserted or dropped within the open end 72 of tapered valve member 62 and contact shoulder 68 for subsequent fitting about frustoconical section 56. Next, retainer sleeve 84 is dropped or inserted within open end 72 of valve member 62 adjacent shoulder 58 about inner end section 60 in contact with the outer peripheral surface of connector 76 for holding halves 78 in position about frustoconical section 56. Tapered surface 86 acts as a guide for urging halves 78 against frustoconical section 56 between opposed shoulders 58 and 68. Split ring 90 is then mounted in groove 74 to hold retainer sleeve 84 in position. To remove or disassemble tapered plug member 62 from stem 46, ring 90 is first removed. Then, retainer sleeve 84 drops from the open end of valve member 62 and connector halves 78 are next removed thereby to permit removal of plug valve member 62 from stem 46 in a minimum amount of time in a simple manner. Connector halves 78 during movement of stem 46 and valve member 62 to open position have opposed ends in abutting contact with opposed shoulders 58 and 68 for transmitting an opening force from handle 48 and stem 46 to valve member 62 for moving valve member 62 to open position.

Referring now to FIGS. 5 and 6, another embodiment of the present invention is illustrated in which a valve member is removably mounted on the end of a stem for blocking fluid flow across a flow passage. Valve 10A has a body 12A with a flow passage 14A extending through body 12A and a fixed valve seat 24A is provided on body 12A about flow passage 14A. A stem 46A has an extending inner end portion 50A defining a large diameter cylindrical section 54A, an intermediate frustoconical section 56A, and a small diameter cylindrical section 60A defining an annular shoulder 58A between frustoconical section 56A and small diameter end section 60A.

A handle 48A is mounted on the outer end of stem 46A and a valve member 62A is mounted on the inner end of stem 46A for movement with stem 46A between open and closed positions relative to seat 24A and flow passage 14A. Valve member 62A includes a ball or ball seat 94A for seating on fixed seat 24A and a housing 96A fitting about end portion 50A in abutting contact with shoulder 52A on stem 46A. Housing 96A has a central bore and an internal shoulder 68A about the central bore. Connector halves 78A fit about frustoconical section 56A between shoulders 58A and 68A. Ball 94A is secured to housing 96A by a small thickness end portion 98A crimped about ball 62A.

For securing or mounting valve member 62A onto stem 46A, ball housing 96A is fitted about end portion 50A of stem 46A in abutting contact with shoulder 52A. Then, connector halves 78A are dropped within the open end of housing 96A about frustoconical section 56A and in contact with shoulder 68A. Next, retainer sleeve 84A is dropped within the open end of housing 96A and tapered inner end surface 86A urges connector halves 78A against frustoconical section 56A while fitting over small diameter end portion 60A and stem 46A. Ball 94A is then inserted within the open end of housing 96A and end portion 98A is then crimped about ball 94A to engage the inner end of retainer sleeve 84A to hold retainer sleeve 84A in position. While ball 94A is not normally removed from crimped end portion 98A, ball 94A may be removed from housing 96A if desired by deforming end portion 98A to permit removal of ball 94A. Then, retainer 84A is removed along with connector 78A. Housing 96A is then removed from end portion 50A.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

I claim:
1. A valve comprising:
   a valve body having a flow passage therethrough and a bore communicating with the flow passage extending in a perpendicular relation to the flow passage;
   a valve seat about said flow passage;
   a valve housing mounted within said bore adjacent said valve seat;
   a valve stem mounted within said housing having an outer end portion extending outwardly of said housing and an inner end portion extending inwardly of said housing, said inner end portion having an inwardly tapering frustoconical section defining an outwardly facing annular shoulder;
   a valve member having a central bore therethrough receiving said inner end portion of said valve stem and defining an inwardly facing annular shoulder about said central bore in spaced opposed relation to said outwardly facing shoulder on said stem;
   actuating means connected to said stem to move said stem and valve member between open and closed portions relative to said actuating means connected to said stem to move said stem and valve member between open and closed positions relative to said valve seat; and mounting means within the central bore of said valve member between said inner end portion and said valve member for mounting said valve member on said inner end portion, said mounting means including a connector split into two halves fitting about said inwardly tapering frustoconical section of said inner end portion between and adjacent said opposed shoulders on said valve member and said frustoconical section, said connector halves engaging said opposed shoulder in abutting relation during movement of said valve member and stem to said open position for transmitting an opening force from said actuating means and stem to said valve member, and removable retaining means for retaining said connector halves in position about said frustoconical section.

2. A valve as set forth in claim 1 wherein said removable retainer means includes a retainer sleeve within the bore of said valve member fitting about said connector halves and said stem inner end portion for holding said connector halves against said frustoconical section.

3. A valve as set forth in claim 2 wherein a split ring is positioned between said retainer sleeve and said valve member and removably secures said retainer sleeve within said valve member.

4. A valve as set forth in claim 1 wherein said valve member comprises a ball for seating on the valve seat and a valve housing about said stem inner end portion for securing said ball.

5. A valve as set forth in claim 1 wherein said valve member comprises a tapered plug valve member and said seat comprises a tapered seat receiving said plug valve member in closed position.

6. In a valve having a valve member connected to the end of a stem for movement between open and closed positions relative to a valve seat across a flow passage; an improved mounting means for attaching the valve member to a frustoconical section of the stem received by a central bore of the valve member, the valve member and frustoconical section having spaced opposed facing shoulders; said improved mounting means comprising:

a frustoconical connector split into two halves fitting about said frustoconical inner end portion of said stem between and adjacent the opposed shoulders on the valve member and said frustoconical section; and a removable retainer sleeve about said connector halves for holding said connector halves about said frustoconical section, said connector halves during movement of said stem and valve member to an open position having opposed ends in abutting contact with said opposed shoulders on said stem and valve member for transmitting an opening force from said stem to said valve member for moving said valve member to said open position.

7. In a valve as set forth in claim 6 wherein said valve member comprises a ball for seating on the valve seat and a housing about said ball.

8. In a valve as set forth in claim 6 wherein said valve member comprises a tapered plug valve member and said seat comprises a tapered frustoconical seat receiving said tapered plug valve member in closed position.

9. In combination with a plug valve having a valve body with a flow passage therethrough and a hollow valve seat across the flow passage, a hollow plug valve member for said valve seat, and a stem received by said hollow plug valve member for movement of said plug valve member between open and closed positions relative to said valve seat; improved mounting means for removably mounting said plug valve member on said stem and comprising:

a split connector between said stem and said plug valve member forming two halves mounted about said stem;

a retaining sleeve within said hollow plug valve member about said connector halves and releasable holding means for supporting and maintaining said retaining sleeve about said connector halves for holding said halves against said stem; and force transmitting means on said stem and said plug valve member engaging opposed ends of said connector upon movement of said valve member to said open position for transmitting an opening force form said stem through said connector to said plug valve member.

10. The combination as set forth in claim 9 wherein said valve stem has a frustoconical section defining an annular shoulder and said split connector is frustoconical shaped and mounted about said frustoconical section adjacent said annular shoulder.

11. The combination as set forth in claim 10 wherein a split retainer ring is mounted on said hollow plug valve for holding said retaining sleeve in position.

12. The combination as set forth in claim 10 wherein said plug valve member is of a frustoconical shape having a central bore therethrough and defining an inner annular shoulder about said bore positioned adjacent an end of said connector halves, said inner annular shoulder on said plug valve member being in opposed facing relation to said annular shoulder on said stem whereby upon an opening force being applied by said stem against said plug valve member said shoulders are in abutting relation with said opposed ends of said connector halves for transmitting force from said stem to said plug valve member.

13. A method of assembling a hollow valve member onto a tapered section of a valve stem for moving the valve member between open and closed positions relative to a fixed valve seat; said method comprising:

positioning the tapered section of the stem within the hollow valve member from one open end thereof;

then mounting from the other open end of the valve member a pair of connector halves about the tapered section of the stem between the stem and valve member; and next mounting a retaining sleeve within the other open end of the valve member about said pair of connector halves and removably securing said retainer sleeve within the valve member for retaining said connector halves about said tapered section of the stem.

14. A method of assembling a hollow frustoconical valve member onto an extending end portion of a valve stem for moving the valve member between open and closed positions relative to a fixed valve seat; said method comprising:

providing a central bore through said valve member and forming an inner annular shoulder about said bore facing inwardly;

providing a frustoconical section on said extending end portion of the valve stem to define an outwardly facing annular should adjacent the end of said valve stem in spaced opposed relation to said inwardly facing shoulder;

then mounting a pair of frustoconical connector halves about the frustoconical section of the valve stem between the stem and valve member with the connector halves between said opposed annular shoulders; and next mounting a removable retaining sleeve onto the extending end portion of said stem and about the frustoconical halves for removably retaining said connector halves thereon between said opposed shoulders.

15. The method of assembling a hollow frustoconical valve member onto a valve stem as set forth in claim 14 further including the step of:

mounting a split retaining ring on said valve member adjacent an end of said retaining sleeve for removably mounting said retaining sleeve onto said stem.

16. The method of assembling a hollow frustoconical valve member onto a valve stem as set forth in claim 14 further including the step of:

mounting said frustoconical connector halves about said frustoconical section of the valve stem with the large diameter end of said connector halves being adjacent said inner annular should of said valve member and the small diameter end of said connector halves being adjacent said annular shoulder on said frustoconical section of said stem.

* * * * *